July 1, 1969 R. B. WILLI 3,452,962
METHOD OF REDUCING PRESSURE RISE IN A HYDRAULIC MACHINE
Filed Dec. 1, 1966 Sheet 1 of 3

INVENTOR
RICHARD B. WILLI
BY
Seidel & Gonda
ATTORNEYS.

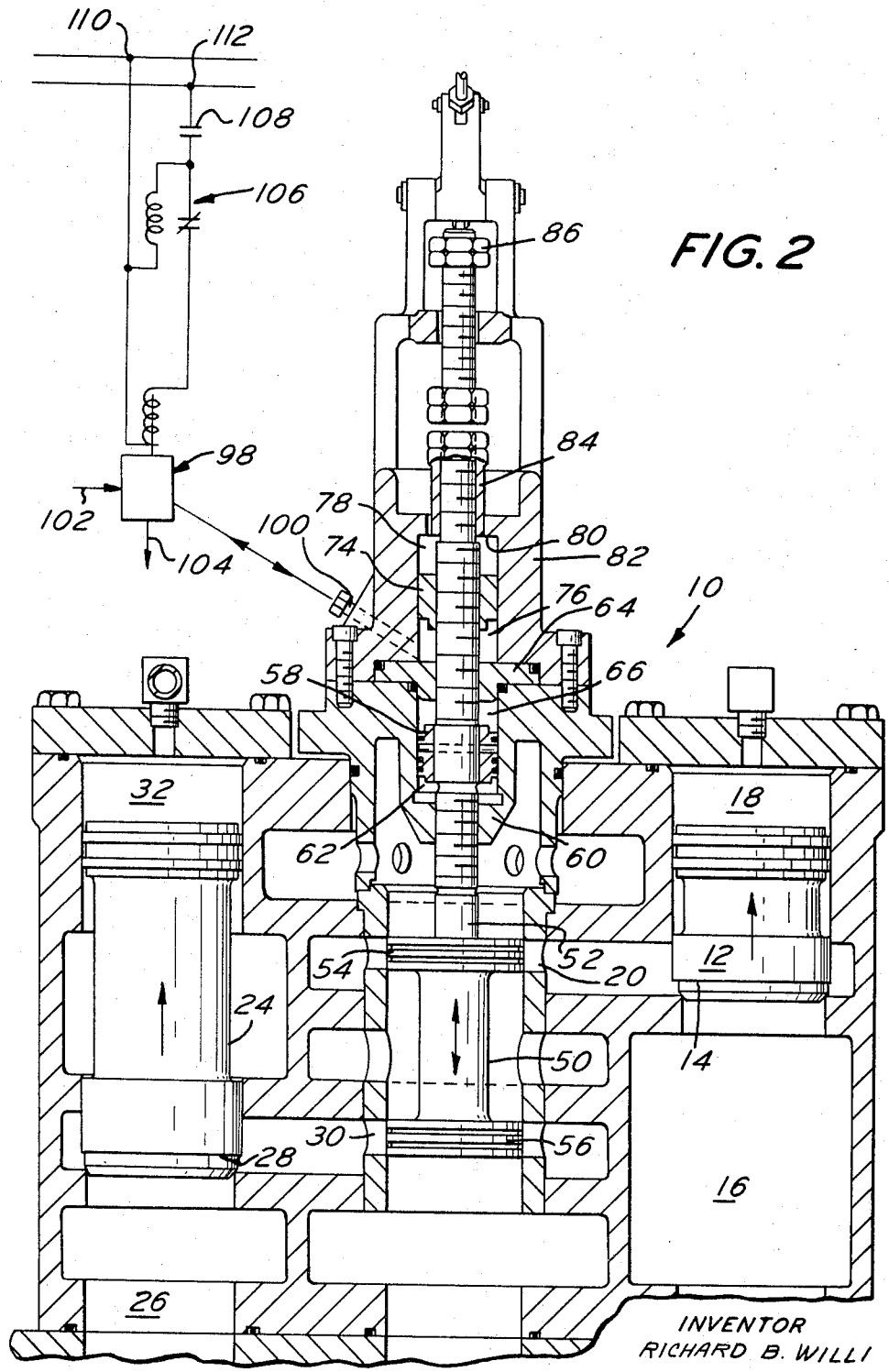

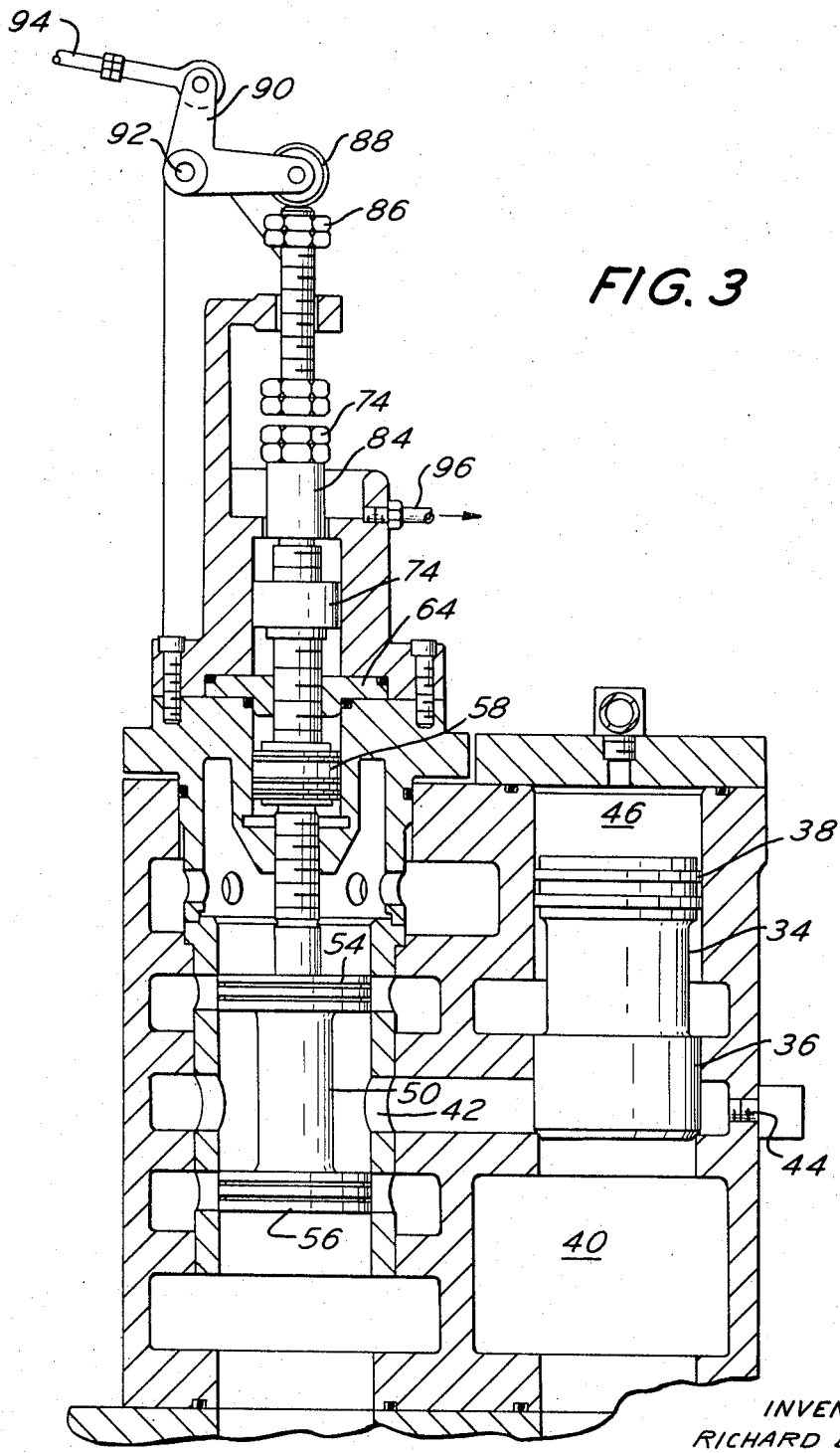

United States Patent Office 3,452,962
Patented July 1, 1969

3,452,962
METHOD OF REDUCING PRESSURE RISE IN A HYDRAULIC MACHINE
Richard B. Willi, Norristown, Pa., assignor to Baldwin-Lima-Hamilton Corporation, Philadelphia, Pa., a corporation of Delaware
Filed Dec. 1, 1966, Ser. No. 598,366
Int. Cl. F03b *15/20;* F17d *1/08, 3/00*
U.S. Cl. 253—1        2 Claims

ABSTRACT OF THE DISCLOSURE

This disclosure relates to the provision of a time delay for the governor of a hydraulic turbine or pump-turbine. The time delay prevents the governor from closing the wicket gates when the load on the turbine or pump-turbine is suddenly removed. Means may also be provided for opening the wicket gates to an over gate position when the load is suddenly removed and thereafter closing the wicket gates.

---

This invention relates to a control means and more particularly to a control means in a turbine or pump-turbine for reducing the pressure rise therein upon sudden loss of load when the turbine or pump-turbine is operated as a prime mover.

The runners of low specific speed turbines and pump-turbines tend to reduce the rate of water flowing through them when the load they are carrying is suddenly removed and they over speed. Sudden removal of load would occur if, for example, the turbine were driving a generator which lost its load due to the failure or burning out of a transformer; a similar fault in the electrical system; etc. Upon sudden loss of load, the governor in the turbine or pump-turbine will normally initiate closing of the wicket gates. The reduction in the rate of water flow created by loss of load on the runner in addition to the reduction of flow brought about by closing of the wicket gates, creates a severe water hammer. The water hammer is even more severe when the turbine or pump-turbine is connected to a long penstock.

For example, the rate of flow of water through a particular turbine at normal synchronous speed at full load will be approximately 79 cubic feet per second (c.f.s.). In the most conventional turbines or pump-turbines, the governor, at the moment the load is lost and the speed begins to increase, initiates closure of the wicket gates. This occurs while the rotor is accelerating in speed. In the particular example, the discharge at runway speed will be approximately 23 c.f.s. Thus, it is readily seen that in a very short period of time, the rate of water flow has been reduced by approximately 56 c.f.s. The reduction in water flow should be minimized so that the pressure rise in the pipeline is kept at a minimum. The figures given relate to one specific example and is set forth for purposes of explanation only.

It has been suggested that a bypass or relief valve be utilized so as to minimize the reduction in water flow when the load on a turbine or pump-turbine is lost. However, the provision of a bypass or relief valve involves substantial structural modification of the turbine or pump-turbine and thus should be avoided if possible.

It is an object of the present invention to provide means for reducing pressure rise in a turbine or pump-turbine upon sudden loss of load while such turbine or pump-turbine is operating as a prime mover.

It is another object of the present invention to provide means for minimizing the reduction in water flow when the load on a turbine or pump-turbine has been lost suddenly, which requires only minor modification of the structure of the turbine or pump-turbine and therefore is much less expensive than prior art mechanism.

It is still another object of the present invention to provide a method of reducing pressure rise in a turbine or pump-turbine upon loss of load when operating as a prime mover which is simple in operation and yet highly effective in use.

Other objects will appear hereinafter.

The above enumerated and other objects of the present invention are accomplished by providing the governor of the turbine or pump-turbine with a time delay so that the governor does not cause movement of the gates during the period of time when the runner is going from normal speed to runway speed. In the specific example hereinabove discussed, the difference in reduction of flow rate by utilization of a time delay means in the governor results in a rate of water flow reduction of approximately 45 c.f.s. Thus, by the provision of a time delay in the governor, pressure rise in the turbine is reduced. The pressure rise which results in a water hammer is reduced in general proportion to the reduced rate of interruption in water flow.

In accordance with the present invention, it has been found that a further benefit in reduction of rate of water flow can be obtained if the turbine or pump-turbine is provided with means for opening the wicket gates further than is normally necessary to develop full power. Thus, I open the gates further when the load on the turbine or pump-turbine is lost instead of immediately closing the gates. In this manner, the runner is allowed to reach its maximum overspeed at the over gate position after which the governor initiates closure of the gates. By the provision of an over gate position the rate of flow at discharge in the example above discussed will be approximately 31 c.f.s., thereby reducing pressure rise even further.

Thus, in accordance with the present invention, the governor which controls the wicket gates may be provided with a time delay to reduce water hammer and/or may be provided wtih means for opening the gates to an opening greater than that required for turbine or pump-turbine operation full power position, prior to closing the gates. The greatest possible improvement in limiting water pressure rise is obtained by a combination of these means.

For the purpose of illustrating the invention, there is shown in the drawings a form which is presently preferred; it being understood, however, that this invention is not limited to the precise arrangements and instrumentalities shown.

FIGURE 2 is a section view taken along the line 2—2 of FIGURE 1;

FIGURE 3 is a section view taken along line 3—3 of FIGURE 1;

Figure 1:
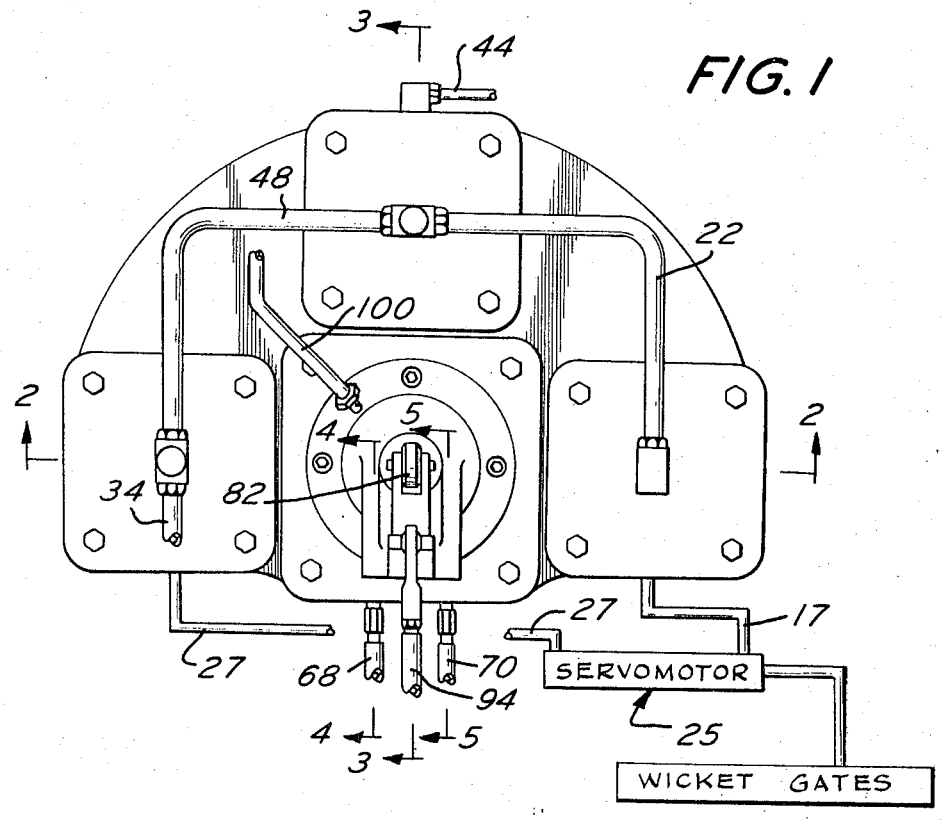
FIGURE 1 is a top plan view of the gate relay valve which forms a part of the governor for a turbine or pump-turbine.

Referring now to the drawings, there is shown in FIGURES 1–3 a gate relay valve indicated generally by reference numeral 10.

The gate relay valve 10 forms a portion of the governor which operates the wicket gates of a turbine or pump-turbine. As is conventional, oil pressure is normally utilized in the gate relay valve for moving the various parts. Neither a particular type of turbine or pump-turbine, nor wicket gates is shown in the drawings since they form no part of the present invention and may be of the type shown in my prior Patent 3,282,563.

The gate relay valve 10 includes a valve 12. The valve 12 is shown in its normal operating position in FIGURE 2. The valve 12 has a reaction lip 14 thereon. The valve 12 may be moved upwardly by impinging a flow of fluid under pressure through a port 20 so that it is directed against the reaction lip 14. The fluid under pressure will flow into a chamber 16 located under the valve 12. The chamber 16 is connected to a conventional servomotor by a suitable conduit. The servomotor will effect desired movement of the wicket gates which, in this instance, will be an opening of the gates. Fluid within the space 18 above the valve 12 flows through a conduit 22 which is connected to drain.

The gate relay valve 10 includes another valve 24 and a further chamber 26 located under the valve 24. The valve 24 has a reaction lip 28 thereon. The valve 24 may be moved upwardly by impinging a flow of fluid under pressure through a port 30 so that it is directed against the reaction lip 28. After the valve 24 has moved upwardly, fluid under pressure will flow into the chamber 26. The chamber 26 is connected to a conventional servomotor, by a suitable conduit. The servomotor will effect desired movement of the wicket gates which, in this instance will be a closing of the gates. As the valve 24 is moved upwardly, fluid in the chamber 32 above the valve is transmitted to drain through a conduit 34.

Chamber 16 and chamber 26 communicate with conduits 17 and 27 respectively which communicate with opposite ends of a gate servomotor 25 which functions in a conventional manner to open or close the wicket gates (see FIGURE 1). Since the servomotor is conventional and functions in a conventional manner it has not been set forth in detail.

Referring now to FIGURE 3, there is disclosed a valve 34. The valve 34 has lands 36 and 38 thereon. Fluid under pressure from a pressure tank is received in a chamber 40 which is located under the valve 34. Fluid under pressure in the chamber 40 biases the valve 34 upwardly. The fluid under pressure flows through a port 42 and through a conduit 44 to a filter (not shown). During normal operation of the gate relay valve 10, the valve 34 is biased upwardly from the position shown in FIGURE 3 by the constant flow of fluid under pressure into the chamber 40 from a pressure tank. The purpose of the fluid under pressure will be set forth hereinafter in detail. The fluid within the chamber 46 located above the valve 34 flows through a conduit 48 which is connected to drain.

A spool valve 50 is integrally connected to the lowermost end of a shaft 52. The spool valve 50 has lands 54 and 56 thereon. The lands 54 and 56 block ports 20 and 30 respectively when the shaft 52 and the spool valve 50 are in their normal position. During normal operation of the turbine or pump-turbine the shaft 52 and spool valve 50 will be in their normal position.

A piston 58 is fixedly connected to the shaft 52. A housing 60 and the bottom of the piston 58 define a lower chamber 62. A stationary bearing member 64 and the upper surface of the piston 58 define an upper chamber 66. Suitable sealing rings are provided for the bearing member 64.

Figure 4:
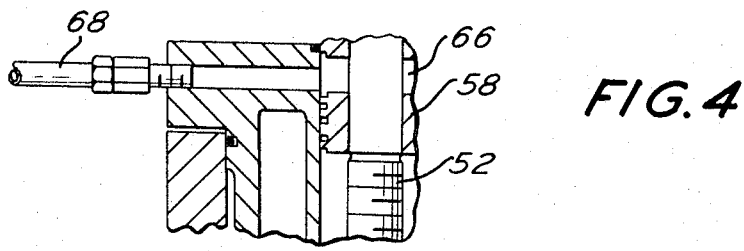
FIGURE 4 is a section view taken along line 4—4 of FIGURE 1.
Figure 5:
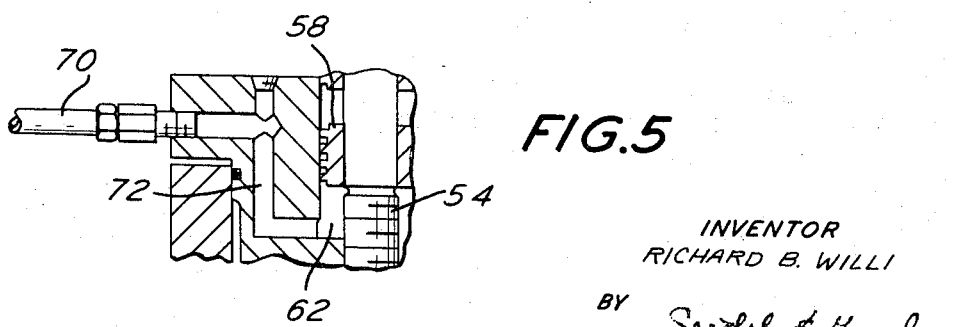
FIGURE 5 is a section view taken along line 5—5 of FIGURE 1.

Pilot pressure to close the wicket gates of a turbine or pump-turbine is received within a conduit 68 which is in direct communication with the chamber 66 above the piston 58, as shown in FIGURE 4. Pilot pressure to open the wicket gates of a turbine or pump-turbine is received within a conduit 70 and flows through a line 72 into the lower chamber 62, as shown in FIGURE 5.

The shaft 52 has a free-floating piston 74 mounted therearound. A chamber 76 is defined by the bottom of the piston 74 and the top of the stationary bearing 64. An upper chamber 78 is defined by the top of the piston 74 and the inner surface 80 of a stationary structure 82. The free-floating piston 74 is moved upwardly when fluid under pressure is received in the chamber 76. The piston 66 will move upwardly until it abuts the surface 80.

A position adjusting nut 84 is mounted on the shaft 52. The position adjusting nut 84 may be rotated and caused to move downwardly. Downward movement will cause the lower end of the nut 84 to project into the chamber 78. When the piston 74 is moved upwardly, it will contact the bottom of nut 84 to thereby lift the valve 50. This permits the wicket gates to be opened at an adjustable rate. Closing rate adjusting nuts 86 are provided on the shaft 52 and functions in a conventional manner. Motion of the shaft 52 is transmitted to a roller 88 which is rotatably connected to a bell crank 90. The bell crank 90 is pivoted at 92 and transmits motion to a linkage 94. The linkage 94 is a feed back to the wicket gate limit valve and governor head pilot valve. A drain 96 to sump is provided at the top of stationary structure 82.

Fluid under pressure from a 3-way solenoid valve 98 is received within a conduit 100 which is in communication with the chamber 76 under the piston 74. The 3-way solenoid operated valve 98 has a pressure supply 102 and and a drain to sump 104. The solenoid valve 98 has a time delay relay 106 attached thereto which has an adjustable time period to permit the governor to close the wicket gates at an adjustable rate. Initiating contact is closed by a unit circuit breaker 108. A suitable source of D.C. power is connected to the terminals 110 and 112 of the circuit for the solenoid operated valve 98. Upon sudden loss of power in the main power line initiating contact is closed by unit circuit breaker 108. The closing of the initiating contact causes the solenoid valve to direct pressure under the floating piston 74. After a predetermined period of time, the time delay relay 106 opens and the chamber 76 is vented to sump. The pressure supply 102 is also vented to sump.

The gate relay valve 10 may be operated to open the wicket gates in the conventional manner. However, should a power failure occur in the main power line for the turbine or pump-turbine, initiating contact is closed by the unit circuit breaker 108. Thereafter, the invention may function to delay closure of the wicket gates and/or open the gates to an over gate position in the following manner.

When the shaft 52 is in its normal position, the lands 54 and 56 of the spool valve 50 block the ports 20 and 30 respectively. Closing of the wicket gates cannot occur while the land 56 blocks the port 30. To initiate closing of the wicket gates, it is necessary to move the shaft 52 downwardly so that the land 56 will not block port 30. Fluid under pressure can thence flow to a gate servomotor to thereby cause closing of the wicket gates. The chambers 16 and 26 are each connected to opposite ends of a gate servomotor which functions in a conventional manner to open or close the wicket gates. Downward movement of the shaft 52 is obtained by pilot pressure to close the wicket gates which enters through conduit 68 into chamber 66 above the piston 58. Fluid under pressure will be received within the conduit 68 substantially immediately after power is lost in the main power line.

However, the 3-way solenoid operated valve is also energized substantially immediately after power has been suddenly lost in the main power line and a supply of fluid under pressure is transmitted through the conduit 100 into the chamber 76 under the floating piston 74. The floating piston 74 moves upwardly and engages the surface 80 of the structure 82. The piston 58 has a smaller effective area than the floating piston 74, and therefore cannot move down to initiate closure of the wicket gates until the pressure is released under the floating piston. The time delay relay 106 will ensure that fluid under pressure will be transmitted to the chamber 76 under the floating piston 74 for a suitable period of time. Thereafter, the circuit will be opened and the pressure within the chamber 76 will be vented to sump 104.

After the pressure in the chamber 76 has been vented, the pilot pressure will be sufficient to move the shaft 52 downwardly. Fluid under pressure which is received in the chamber 40 is received between the lands 54 and 56 of the spool valve 50 through the port 42. As the spool valve 50 moves downwardly, such fluid under pressure will exit through the port 30 which has been at least partially unblocked. The fluid under pressure will impinge upon the reaction lip 28 on the valve 24 and move the valve upwardly. Thereafter, fluid under pressure will be in direct communication with the chamber 26. The fluid under pressure is transmitted from the chamber 26 through a conduit to a suitable servomotor which will cause closure of the wicket gates.

The gates may also be opened to an over gate position prior to closing the same. To accomplish this, the adjusting nut 84 is rotated so that the freely floating piston 74 will contact the lower edge of the adjusting nut 84 prior to contacting the surface 80 of the structure 82. The free-floating piston will move the adjusting nut 84 and the rod 52 connected thereto upwardly so that port 20 will become unlocked. The fluid under pressure which is received between the lands 54 and 56 of the spool valve 50 will exit through the port 20. The fluid under pressure will contact the reaction lip 14 on the valve 12 and move the valve 12 upwardly. The fluid under pressure will be in direct communication with the chamber 16. The fluid under pressure will be transmitted from the chamber 16 through a suitable conduit to a conventional servomotor. The servomotor will cause opening of the gates to an over gate position. The rate of flow of fluid under pressure through the port 20 is controlled by the positioning of the adjusting nut 84. Thus, the wicket gates may be opened to an over gate position so that the pressure rise in the turbine or pump-turbine is minimized.

After the desired time delay has elapsed, the pressure under the piston 74 will be vented to sump and the wicket gates will be closed in the same manner set forth hereinabove.

Opening of the wicket gates is accomplished in a conventional manner. That is, pilot pressure flows through the conduit 70 into the chamber 62 beneath the piston 58. The shaft 52 is displaced upwardly. The land 54 on the spool valve 50 will move out of blocking relation with the port 20. Fluid under pressure will flow through the port 20 and contact the reaction lip 14 on the valve 12. The valve 12 will move upwardly and fluid under pressure will be received in the chamber 16. The fluid under pressure will thereafter flow through a conduit to a suitable servomotor which will cause opening of the gates.

While the preferred fluid under pressure which is to be utilized with the invention is oil, other such fluids, such as water or air could also be used without departing from the invention.

Thus, the present invention provides for a control means for reducing pressure rise in a turbine or pump-turbine. The control means may provide for a delay in the closure of the wicket gates upon sudden loss of power in the main power line. The control means may also cause the wicket gates to open to an over gate position while delaying closure of the wicket gates. The provision of a delay in the closing of the wicket gates has proven highly effective in reducing pressure rise and the water hammer which results therefrom. However, the combination of opening the wicket gates to an over gate position and preventing closure of the wicket gates has provided the greatest possible improvement in reducing pressure rise and the resulting water hammer.

The present invention may be embodied in other specific forms without departing from the spirit or essential attributes thereof and, accordingly, reference should be made to the appended claims, rather than to the foregoing specification as indicating the scope of the invention.

I claim:

1. A method for reducing pressure rise in a turbine, pump-turbine, or the like machine when power has been suddenly lost in the main power line comprising the steps of opening the wicket gates to an over gate position, delaying closure of the wicket gates for a predetermined time, and thereafter closing the wicket gates thus reducing pressure rise and water hammer effects which result from such pressure rise.

2. A method of reducing pressure rise in a hydraulic machine wherein the power from the main power line is suddenly lost including the steps of providing a blocking means to maintain the wicket gates in an open position and prevent closure of the wicket gates in order to reduce pressure rise and resulting water hammer effects which result from such pressure rise, providing a time delay during which the blocking means prevents closure of the wicket gates and maintain the wicket gates in the open position, and thereafter permitting normal closure of the wicket gates.

References Cited

UNITED STATES PATENTS

| | | | |
|---|---|---|---|
| 3,051,186 | 8/1962 | Fisch et al. | 137—25 |
| 3,063,460 | 11/1962 | Krauss | 137—25 |
| 3,276,461 | 10/1966 | Kerensky | 137—25 |
| 3,309,057 | 3/1967 | Tonooka | 253—1 |
| 3,345,823 | 10/1967 | Rakcevic | 61—24 |
| 3,275,293 | 9/1966 | Hosogai et al. | 253—24 |
| 3,339,567 | 9/1967 | Fukasu et al. | 137—12 |

EVERETTE A. POWELL, JR., *Primary Examiner.*

U.S. Cl. X.R.

137—12; 253—24, 26